United States Patent [19]

Kawada et al.

[11] Patent Number: 5,764,328
[45] Date of Patent: Jun. 9, 1998

[54] LIQUID CRYSTAL DEVICE WITH PLURAL FERROELECTRIC OR ANTIFERROELECTRIC LAYER TILT ANGLES PER PIXEL

[75] Inventors: Sachiko Kawada, Kodaira; Yasushi Suzuki, Sayama; Shinya Kondo; Rintarou Takahashi, both of Tokorozawa, all of Japan

[73] Assignee: Citizen Watch Co., Ltd., Tokyo, Japan

[21] Appl. No.: 793,462

[22] PCT Filed: Jul. 2, 1996

[86] PCT No.: PCT/JP96/01834

§ 371 Date: Feb. 26, 1997

§ 102(e) Date: Feb. 26, 1997

[87] PCT Pub. No.: WO97/02510

PCT Pub. Date: Jan. 23, 1997

[30] Foreign Application Priority Data

Jul. 3, 1995 [JP] Japan ................................. 7-167445
Aug. 9, 1995 [JP] Japan ................................. 7-202969

[51] Int. Cl.⁶ ........................... G02F 1/13; G02F 1/141
[52] U.S. Cl. ................... 349/173; 349/134; 349/174
[58] Field of Search ............................ 349/134, 173, 349/85, 174

[56] References Cited

U.S. PATENT DOCUMENTS 5,151,804 9/1992 Verhulst et al. .................. 349/191
5,189,536 2/1993 Hanyu et al. ..................... 349/134
5,500,749 3/1996 Inaba et al. ...................... 349/126
5,543,943 8/1996 Hanyu et al. ..................... 349/132
5,583,680 12/1996 Nakamura et al. ................ 349/134
5,654,784 8/1997 Yasuda et al. .................... 349/129

FOREIGN PATENT DOCUMENTS 4-240820 8/1992 Japan.
4-267223 9/1992 Japan.
4-316019 11/1992 Japan.
7-128690 5/1995 Japan.

Primary Examiner—Anita Pellman Gross
Attorney, Agent, or Firm—Finnegan, Henderson, Farabow, Garrett & Dunner

[57] ABSTRACT

A liquid crystal device used for electro-optical devices, in which each parameter of the liquid crystal having layer structures is specified to provide a liquid crystal high in stress resistance and capable of gray scale display. The liquid crystal held between a pair of parallel substrates is either ferroelectric or antiferroelectric and represents layer structures. A plurality of substrate interface tilt angles can be set for the layer structures. The layer structures can be configured asymmetric or symmetric about a plane intermediate between the parallel substrates. With this configuration, a liquid crystal device is constructed having a plurality of layer structures including at least one layer structure, which has (1) a substrate interface layer tilt angle of 0° to 3° and the c director pretilt of 3° to 5°, or (2) a substrate interface layer tilt angle of 4° to 7° and the c director pretilt of 0° to 3°, or (3) a substrate interface layer tilt angle of 8° to 20° and the c director pretilt of 9° to 90° or less.

14 Claims, 17 Drawing Sheets

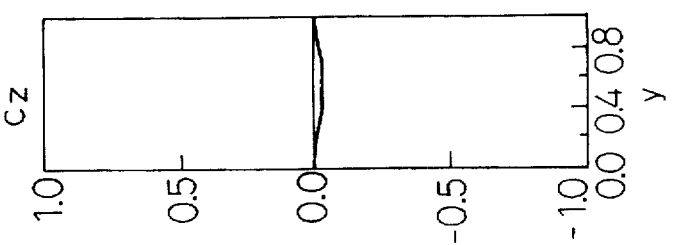
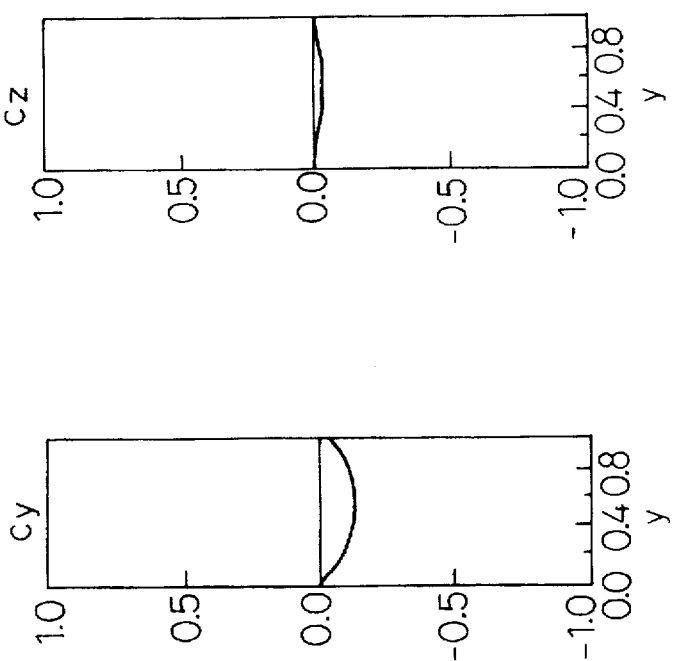
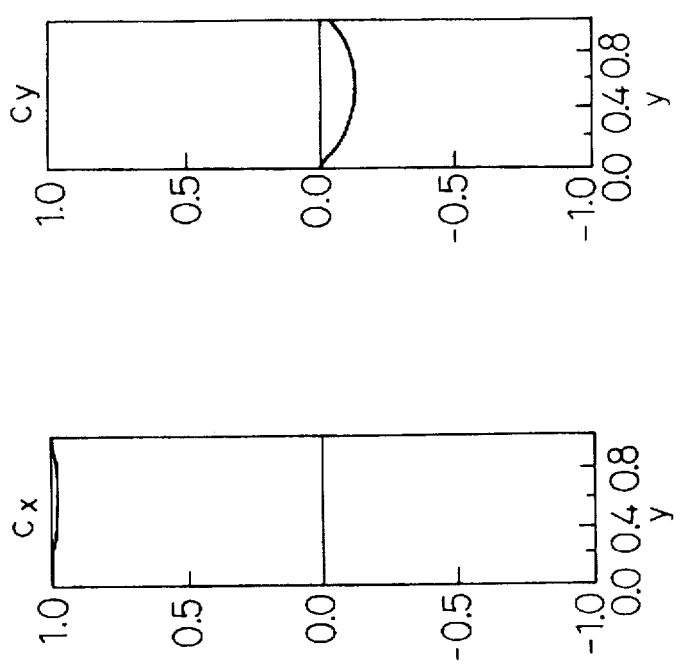
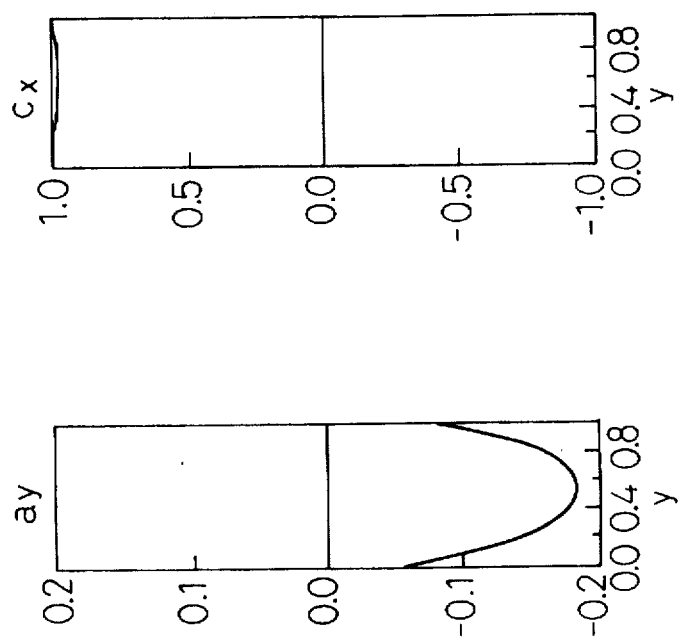

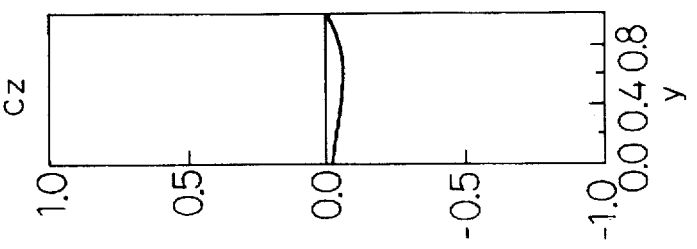
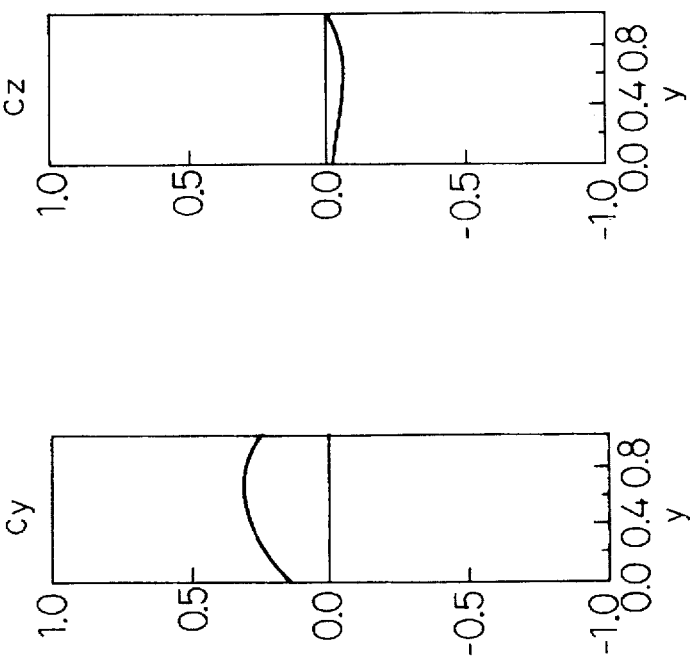
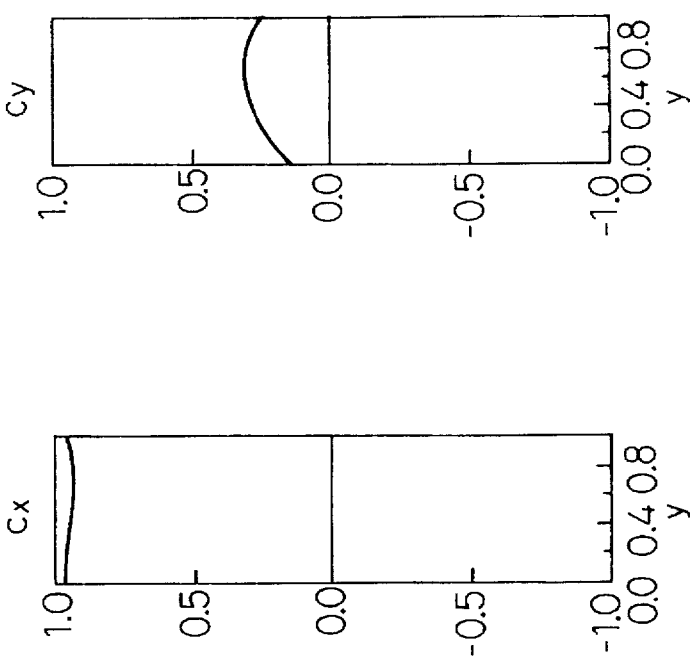
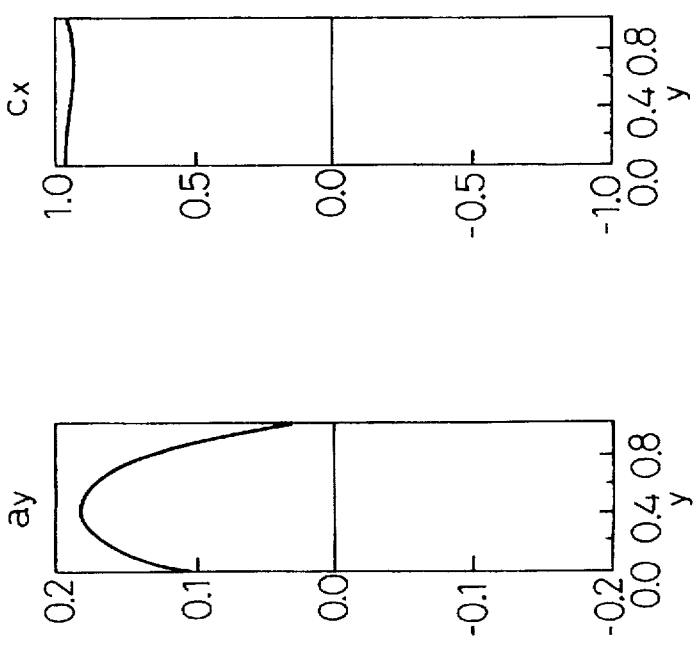

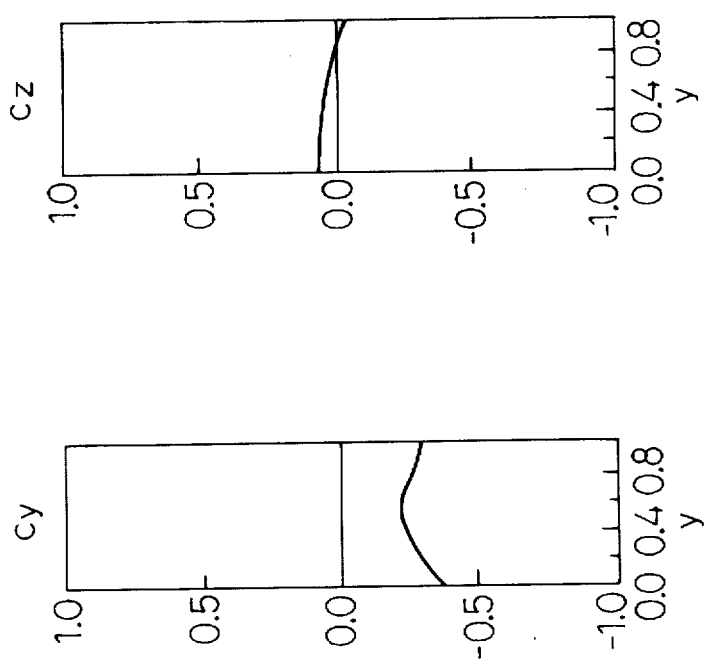
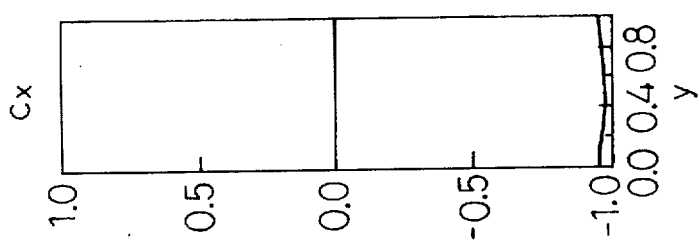
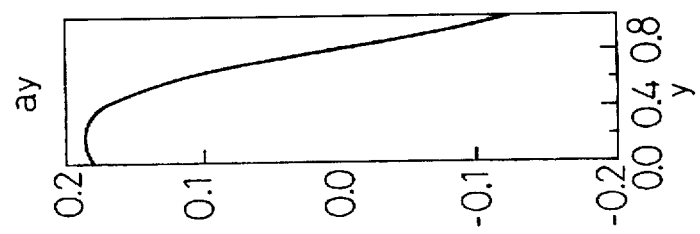
Fig.5A  Fig.5B  Fig.5C  Fig.5D

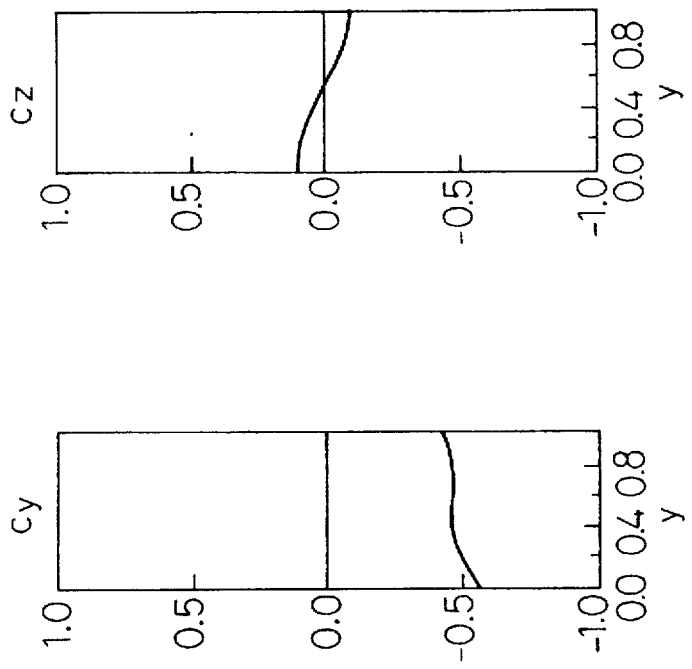
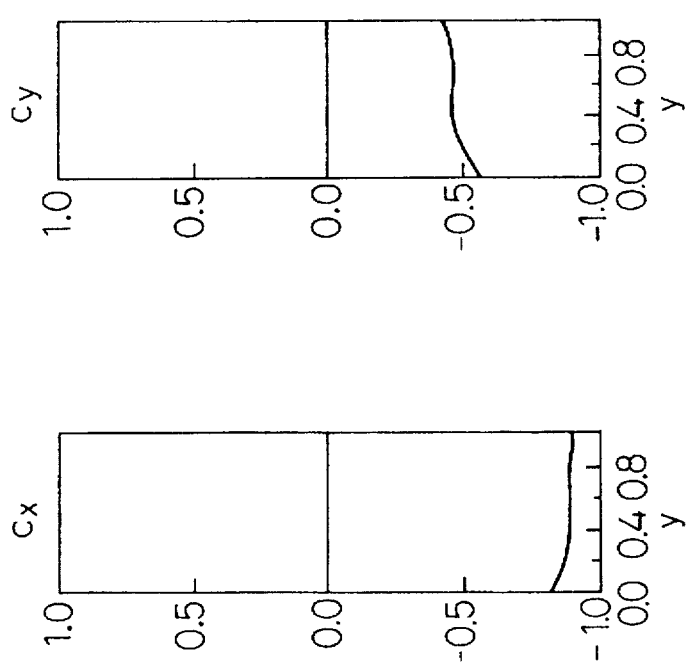
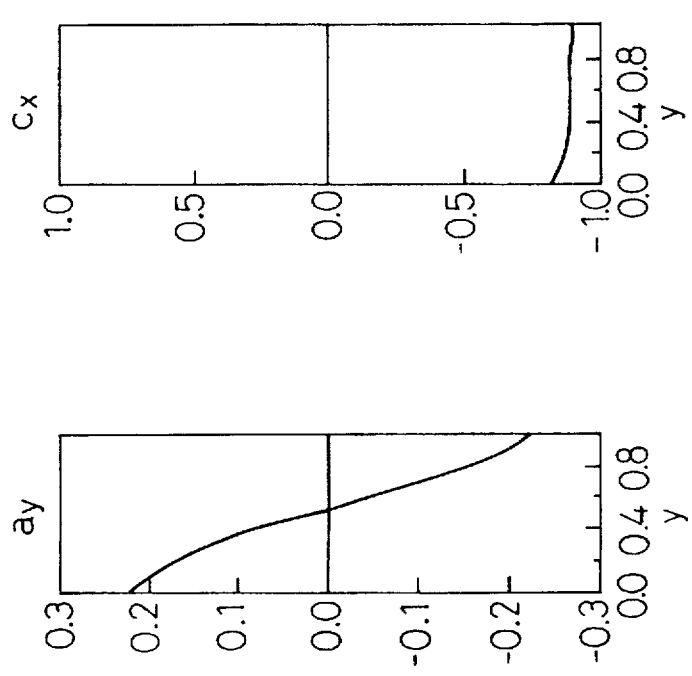
Fig.6A  Fig.6B  Fig.6C  Fig.6D 5,764,328

LIQUID CRYSTAL DEVICE WITH PLURAL FERROELECTRIC OR ANTIFERROELECTRIC LAYER TILT ANGLES PER PIXEL

TECHNICAL FIELD

The present invention relates to a liquid crystal device, and in particular to a liquid crystal device used for electro-optic devices using a liquid crystal display element or a liquid crystal optical shutter array. The invention relates, in particular, to a liquid crystal device using a ferroelectric liquid crystal or an antiferroelectric liquid crystal characterized by layer structures and molecular arrangement.

BACKGROUND ART

A liquid crystal device using a ferroelectric liquid crystal, as disclosed by Clark, et al., utilizes the spontaneous polarization of liquid crystal molecules. The spontaneous polarization of the ferroelectric liquid crystal is attributable to the molecular structure. Specifically, in a structure of a racemic modification having asymmetric carbon in molecules with a dipole moment perpendicular to the major axis of the molecule, the dipole moments are aligned in the same direction to thereby develop a spontaneous polarization in a SmC* phase with the liquid crystal molecules aligned along the major molecular axis and the rotation thereof around the major axis is hindered. In the ferroelectric liquid crystal, two stable molecular arrangements can be secured by controlling the direction of spontaneous polarization by applying an electric field from an external source. Of these two states, one displays white and the other displays black. These stable states are held after the electric field is removed, and therefore have a memory characteristic. Also, the response of the ferroelectric liquid crystal to the voltage application, which is derived from the primary coupling with the electric field, is so high that the ferroelectric liquid crystal is expected to replace the paraelectric liquid crystal. In view of this, many attempts have so far been made to use the ferroelectric liquid crystal in practical applications.

However, the ferroelectric liquid crystal is a system having asymmetric carbon and therefore has a spiral characteristic. Also, since layer structures are formed in the SmC* phase, it is difficult to control the direction of spontaneous polarization. As a result, a liquid crystal device has been difficult to produce using the ferroelectric liquid crystal having a bistable characteristic and a memory characteristic as presented by Clark, et al. Especially, the layer structures of the ferroelectric liquid crystal are so complex that a twist structure, a chevron structure, etc. are known in addition to the book shelf structure initially suggested. It has thus become apparent that the layer structures are involved in the various characteristics of the liquid crystal device using the ferroelectric liquid crystal.

As part of study on the molecular orientations including the layer structures, Kanbe et al., disclosed a liquid crystal device (Unexamined Patent Publication (Kokai) No. 63-124030) using a ferroelectric liquid crystal in which a c director has a pretilt rotationally symmetric about the substrate center in the neighborhood of each of the two substrates, exhibiting the chevron layer structures and a spray orientation ("Next-Generation Liquid Crystal Display and Liquid Crystal Material", published by CMC, 1992).

The chevron layer structures, however, have a stable molecular arrangement, at the time of driving, different from the stable molecular arrangement at the time of storage, and therefore has the disadvantage that the contrast is low at the time of storage and flickering occurs at the time of driving. Further, with the ferroelectric liquid crystal, which is inherently an enantiomeric system having asymmetric carbon, the chevron layer structures cannot be considered bistable in terms of energy. Therefore, the stability of the ferroelectric liquid crystal, after being kept in stock in the stable state for long time, increases to such an extent that it is no longer possible to switch to the other state (this phenomenon is hereinafter called "unilaterally stable"), thereby leading to a drawback in the lack of long-term reliability.

Further, these layer structures are not as strong as crystal and easily succumb to stress and break under any small external pressure which may be exerted on the substrate. Once the layer structures of the liquid crystal device using the ferroelectric liquid crystal are broken, it must be heated up to the isotropic temperature and then cooled to rebuild the layer structures.

Similar layer structures in the antiferroelectric liquid crystal, on the other hand, have a higher rigidity than the layer structures of the ferroelectric liquid crystal. This is considered primarily due to the multi-domain structure. The multi-domain structure is a state in which fine layer structures coexist in a minute area at wavelength level. Conceptually, it is a state in which many pillars stand in a small area. The high rigidity of the layer structures of the antiferroelectric liquid crystal is considered to be derived from the antagonism between these layers.

In the antiferroelectric liquid crystal, the field induced phase transition to the ferroelectric phase occurs under an electric field, and depending on the polarity of the electric field exerted, two stable molecular arrangements are obtained as in the case of the ferroelectric liquid crystal. The antiferroelectric liquid crystal, however, is different from the ferroelectric liquid crystal in that it has no memory characteristic with the two stable molecular arrangements. Once the electric field is removed, therefore, the antiferroelectric liquid crystal alternates between these two stable molecular arrangements in every other layer and retransition occurs to the antiferroelectric phase where the spontaneous polarization is cancelled. Further, the antiferroelectric liquid crystal has a plurality of subphases (ferri phases) called the demon's steps. The possibility of gray scale display is being studied using the field induced phase transition to this ferri phase. Since the field induced phase transition sensitively responds to a slight voltage difference, however, selective partial phase transition is difficult, and therefore a satisfactory gray scale display has not yet been obtained.

In the ferroelectric liquid crystal, since the ferroelectric liquid crystal has no subphase unlike the antiferroelectric liquid crystal, gray scale display by partial switching is impossible to realize. Also, the ferroelectric liquid crystal, which has a monodomain instead of a multidomain structure, has a uniform layer structure over a wide area. Therefore, the ferroelectric liquid crystal is constructed the same way as if a large roof is supported by a small number of pillars, and easily succumbs to stress.

DISCLOSURE OF THE INVENTION

Accordingly, the object of the present invention is to provide a liquid crystal device with a structure that can obviate the disadvantages attributable to the conventional layer structures of a liquid crystal device using a liquid crystal having the layer structures.

Specifically, the object of the invention is to provide a reliable liquid crystal device using the ferroelectric liquid crystal, in which gray scale display is realizable with high contrast without any contrast difference between storage time and drive time, no flicker occurs at the time of drive, and a long-term bistability is assured on the one hand, and the liquid crystal device using the antiferroelectric liquid crystal is capable of selectively controlling the field induced phase transition on the other hand.

In order to achieve the above-mentioned object, according to a first aspect of the invention, there is provided a liquid crystal device comprising a pair of parallel substrates each having an electrode and a liquid crystal with layer structures held between the substrates so as to form pixels between the electrodes, characterized in that the layer structures are arranged in such a manner that there are at least two substrate interface layer tilt angles formed between the normal to one of the substrates and the layer structure plane in the same pixel, at least one layer in the same pixel has the substrate interface tilt angle of selected one of (1) 0° to 3°, (2) 4° to 7°, and (3) 8° to 20°, and the c director pretilt providing an angle between the c director constituting a unit vector of projection of the liquid crystal molecules on the layer plane at the substrate interface and the component of the layer plane parallel with the substrate is selected one of 3° to 5° for (1), 0° to 3° for (2), and 9° to 90° for (3) above.

In the process, the layer structures in the same pixel are partly or wholly formed asymmetric or symmetric about a symmetry plane equidistant from the two substrates, and a liquid crystal is ferroelectric or antiferroelectric.

In order to achieve the above-mentioned objects, according to a second aspect of the invention, there is provided a liquid crystal device comprising a pair of parallel substrates each having an electrode and a ferroelectric liquid crystal with layer structures held between the substrates so as to form pixels between the electrodes, characterized in that the c director providing a unit vector of projection of the liquid crystal molecules on the layer structure plane at the substrate interface in the same pixel is arranged symmetrically about a symmetry plane equidistant from the two substrates, the substrate interface layer tilt angle between the layer plane and the normal to one of the substrates is selected one of (1) 0° to 3°, (2) 4° to 7°, and (3) 8° to 20°, and the c director pretilt providing an angle between the c director and the component of the layer plane parallel with the substrates is 3° to 5° for (1), 0° to 3° for (2) and 9° to 90° for (3) above.

BRIEF DESCRIPTION OF THE DRAWINGS

The above and other objects, features and advantages will be made apparent by the detailed description of embodiments taken in conjunction with the accompanying drawings, in which:

FIGS. 3A to 3D are diagrams showing a first example configuration of the layer structures and the molecular arrangement of a liquid crystal device according to the invention, in which the distribution along y axis of the y-axis component of the a director and the x-axis, y-axis and z-axis components of the c director are shown along the abscissa with the distance between the substrates specified as unity;

FIGS. 4A to 4D are diagrams showing a second example configuration of the layer structures and the molecular arrangement of a liquid crystal device according to the invention, in which the distribution along the y axis of the y-axis component of the a director and the x-axis, y-axis and z-axis components of the c director are shown along the abscissa with the distance between the substrates specified as unity;

FIGS. 5A to 5D are diagrams showing a third example configuration of the layer structures and the molecular arrangement of a liquid crystal device according to the invention, in which the distribution along the y axis of the y-axis component of the a director and the x-axis, y-axis and z-axis components of the c director are shown along the abscissa with the distance between the substrates specified as unity;

FIGS. 6A to 6D are diagrams showing a fourth example configuration of the layer structures and the molecular arrangement of a liquid crystal device according to the invention, in which the distribution along y axis of the y-axis component of the a director and the x-axis, y-axis and z-axis components of the c director are shown along the abscissa with the distance between the substrates specified as unity;

BEST MODE FOR CARRYING OUT THE INVENTION

Figure 1A:
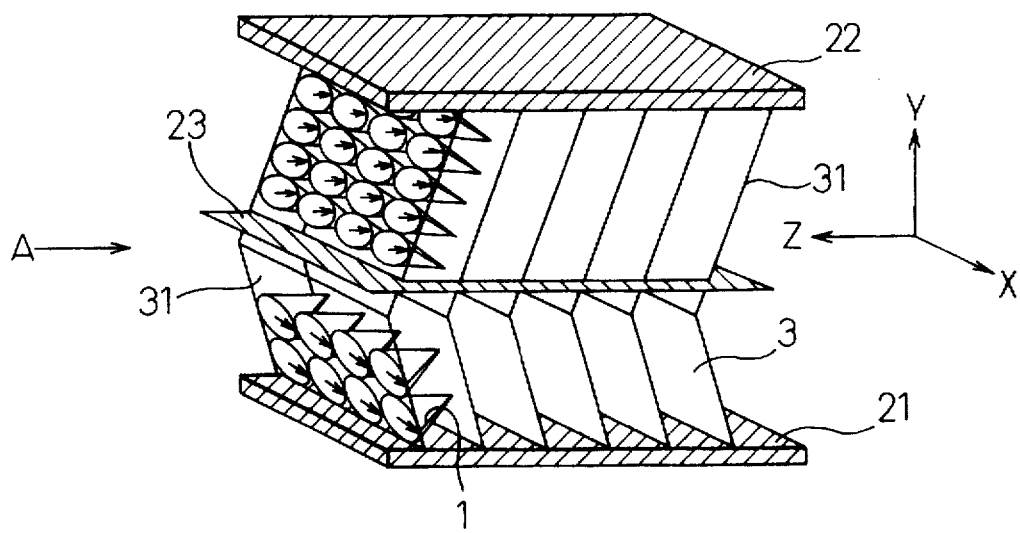
FIG. 1A is a perspective view showing a first model of layer structures and a molecular arrangement in a liquid crystal device according to the present invention.

FIGS. 1A to 1F are model diagrams showing a molecular arrangement (c director) and layer structures of a ferroelectric liquid crystal and an antiferroelectric liquid crystal. As shown in FIG. 1A, in a liquid crystal device according to the present invention, liquid crystal molecules 1 are held between a pair of parallel substrates 21, 22, and layer structures 3 are formed as the centers of gravity of the liquid crystal molecules 1 are aligned from the lower substrate to the upper substrate. Also, reference numeral 23 in FIG. 1A designates a symmetry plane equidistant from the substrates 21, 22. In the first model diagram shown in FIG. 1A, part or the whole of the layer structures 3 in the same pixel is asymmetric about the symmetry plane 23 equidistant from the substrates 21, 22.

Explanation will be made hereinafter in this specification on the assumption that the x axis and z axis exist in the plane parallel with the substrates 21, 22 and the y axis exists in the direction perpendicular to the substrates 21, 22 as shown in FIG. 1A.

Figure 1B:
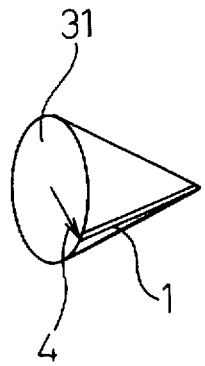
FIG. 1B is a perspective view showing the range in which a single liquid crystal molecule is movable.
Figure 1C:
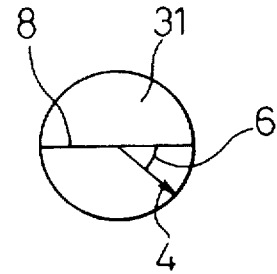
FIG. 1C is a bottom view of the cone of FIG. 1B taken from the perpendicular direction to the layer plane.

The range within which a single liquid crystal molecule 1 is movable is presented as a conical model shown in FIG. 1B. The bottom of the cone is located at the same position as the layer plane 31. FIG. 1C is a bottom view of the cone of FIG. 1B taken from the direction perpendicular to the layer plane 31. As shown in FIGS. 1B, 1C, the unit vector of projection of the liquid crystal molecule 1 on the layer plane (cone bottom) 31 is called the c director 4. Also, the angle 6 that the c director 4 forms with the component of the layer plane 31 parallel with the substrates 21, 22 is called a c director pretilt 6 herein.

Figure 1D:
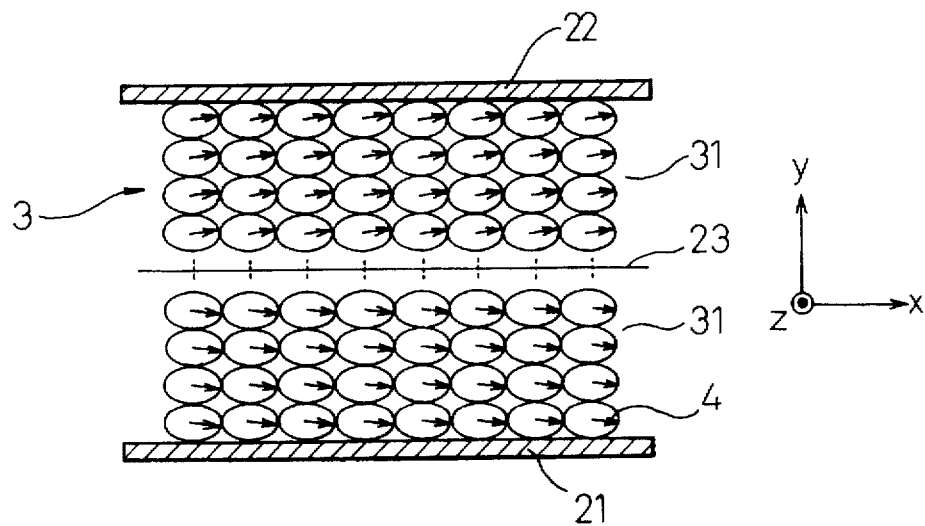
FIG. 1D is a sectional view showing the layer structures of the first model of FIG. 1A taken in the direction of arrow A.

FIG. 1D is a view of the layer structures 3 of the first model of FIG. 1A taken from the direction of arrow A (along the z-axis). In the chevron-type layer structures, the layer plane 31 is inclined and, therefore, the bottom of the cone existing in the layer plane 31 of FIG. 1D appears elliptical. Although only one layer is plotted in FIG. 1D, layer structures similar to the layer structure 3 shown in FIG. 1D are formed continuously in the ferroelectric liquid crystal. The ferroelectric liquid crystal is so structured that all the c directors 4 are positioned in the same direction.

Figure 1E:
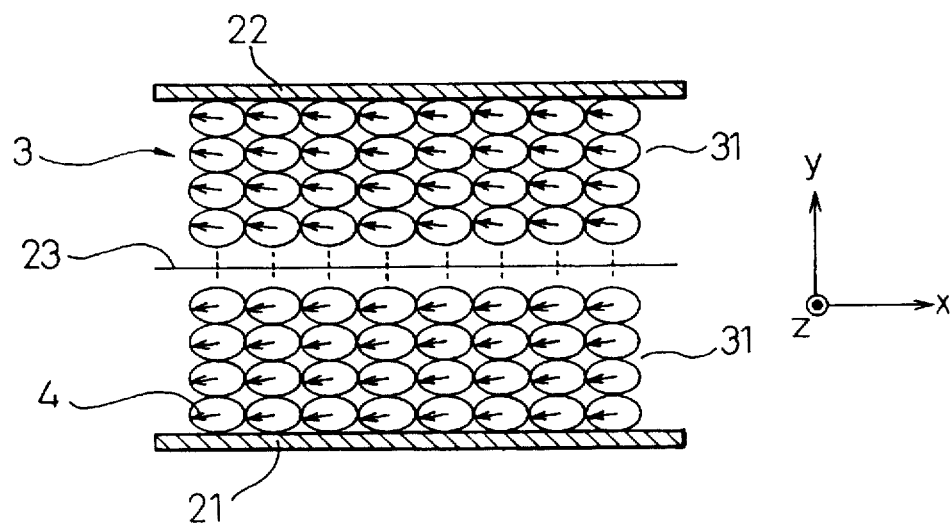
FIG. 1E is a sectional view showing the structure of an antiferroelectric liquid crystal layer adjacent to the layer of FIG. 1D taken in the direction of arrow A in FIG. 1A.

An antiferroelectric liquid crystal also has similar layer structures 3. In the layer structures 3 of the antiferroelectric liquid crystal, however, the c directors 4 are aligned alternately in different directions in the odd-numbered layers and the even-numbered layers. Consequently, assuming that the layer structure 3 shown in FIG. 1D is an odd-numbered layer structure of the antiferroelectric liquid crystal, the even-numbered layer structure 3 of the antiferroelectric liquid crystal takes the form as shown in FIG. 1E.

Figure 1F:
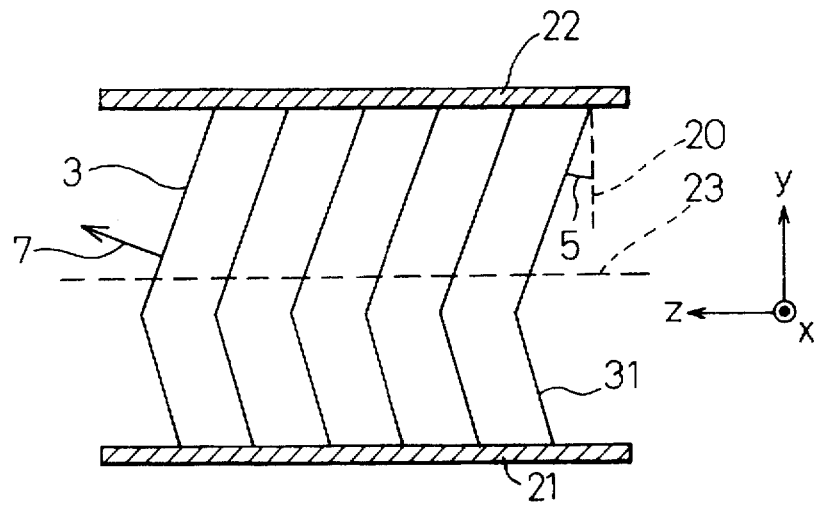
FIG. 1F is a sectional view taken in the plane perpendicular to the substrates of the first model shown in FIG. 1A.

FIG. 1F is a sectional view of the first model of FIG. 1A taken in a plane perpendicular to the x axis. In FIG. 1F, reference numeral 5 designates the angle that the layer plane 31 forms with a normal 20 to one of the substrates 21, 22. The angle 5 is hereinafter called the substrate interface layer tilt angle 5.

Now, a second model of the present invention will be explained with reference to FIGS. 2A, 2B. In the second model, the same component parts as the corresponding ones in the first model are designated by the same reference numerals, respectively.

Figure 2A:
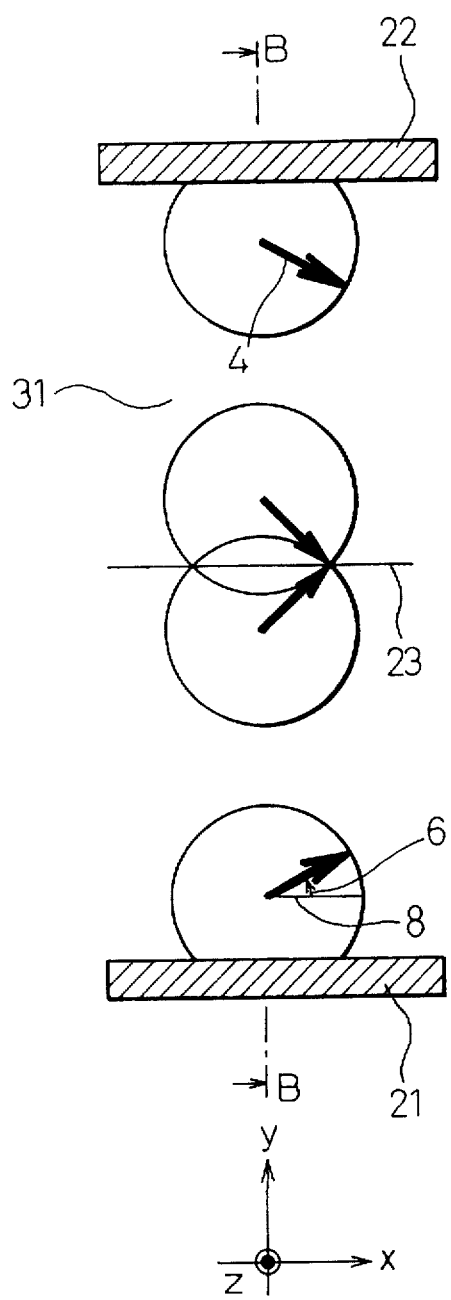
FIG. 2A is a model diagram showing a second model of the layer structures and molecular arrangement in a liquid crystal device according to the invention using a ferroelectric liquid crystal, in which the liquid crystal device with the c director thereof viewed from the layer plane is partially enlarged.

FIG. 2A is a model diagram taken from the direction along the z-axis showing the layer plane 31 containing the c director 4 providing a unit vector of projection of the liquid crystal molecules 1 of the ferroelectric liquid crystal on the layer plane 31, with a part of the liquid crystal device shown enlarged. FIG. 2B shows a sectional view taken in line B—B in FIG. 2A.

Figure 2B:
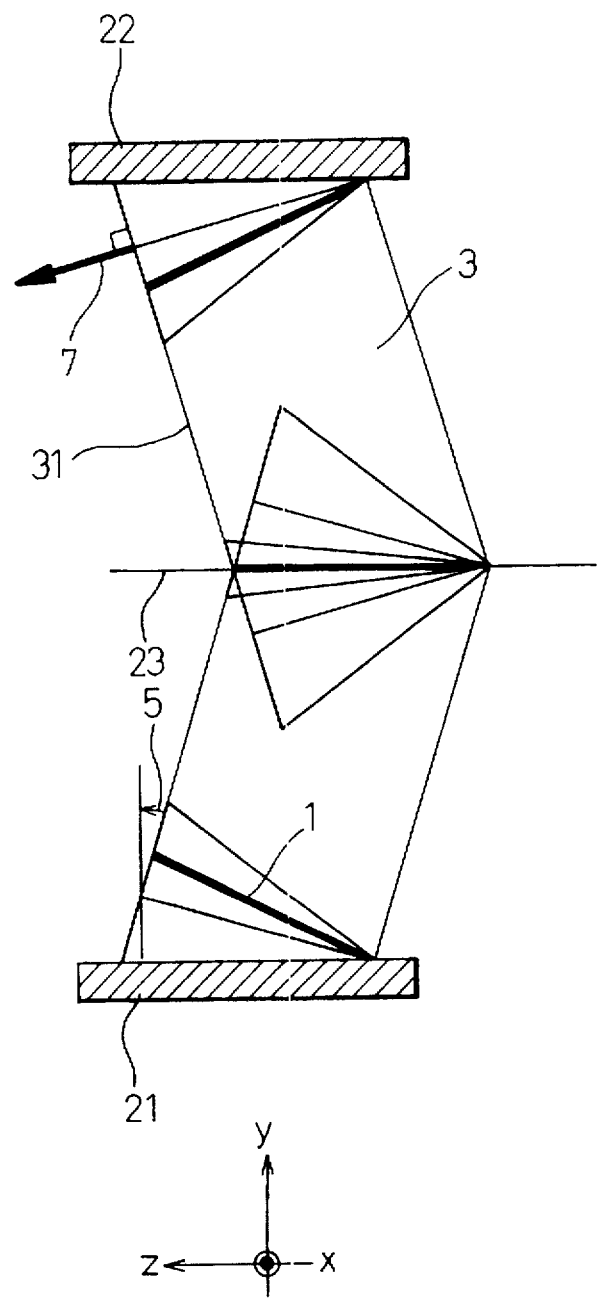
FIG. 2B is a sectional view taken in line B—B in FIG. 2A.

As shown in FIGS. 2A, 2B, the second model of the liquid crystal device comprises liquid crystal molecules 1 of the ferroelectric liquid crystal held between a pair of parallel substrates 21, 22, and each of the liquid crystal molecules 1 has the center of gravity thereof aligned from the lower substrate to the upper substrate thereby to form a layer structure 3. Also, numeral 23 designates a symmetry plane equidistant from the substrates 21, 22. In the second model shown in FIGS. 2A, 2B, the layer structures 3 in the same pixel are partly or wholly symmetric about the symmetry plane 23 equidistant from the substrates 21, 22.

Now, the present invention will be explained in detail on the basis of the first and second models described above using parameters representing the structural arrangement of the layer structures 3 including the a director 7 providing a layer normal vector located perpendicular from the layer plane 31 and the c director 4 providing a parameter representing a molecular arrangement.

Figure 1G:
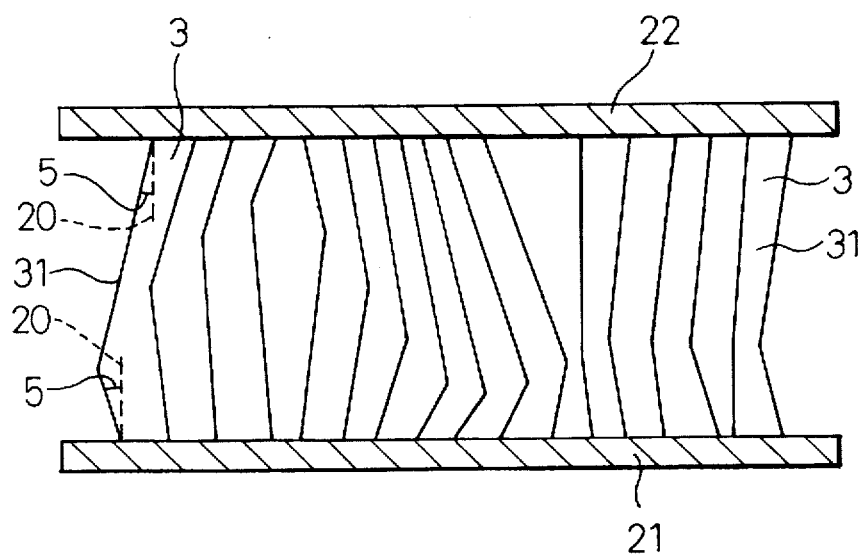
FIG. 1G is a diagram for explaining various forms of layer structures having at least two angles in an actual liquid crystal device.
Figure 1H:
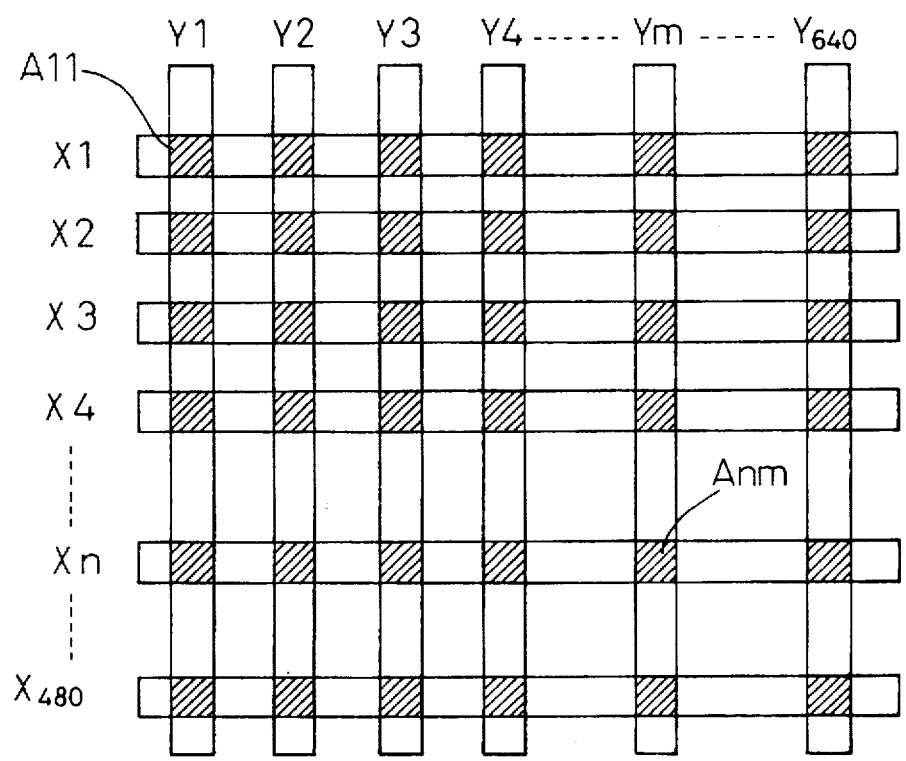
FIG. 1H is a diagram for explaining the pixels of a liquid crystal device by reference to the scanning electrodes and the signal electrodes.

In the above-mentioned model diagram, the tilt of the layer plane 31 is the same for all the layer structures 3. An actual liquid crystal device, which has at least two types of the substrate interface layer tilt angle 5 that the normal 20 to one of the two substrates forms with the layer plane 31 of the layer structure 3 in a single pixel, as shown in FIG. 1G, takes various forms of layer structures. The pixel herein referred to is, as shown in FIG. 1H, a portion (indicated by hatching) Anm at a crossing between a given scanning electrode Xn (n=1 to 480) and a given signal electrode Ym (m=1 to 640) formed on the two substrates.

An explanation will be given about the ATR (attenuated total reflection) method providing means for checking the a director 7 and the c director 4 and a method of determining the layer structures and the molecular arrangement in an actual liquid crystal cell.

The ATR method, which is described in detail in the thesis by Sambles, et al., entitled "Liquid Crystals", 1993, Vol. 13, No. 1, 1-11, etc., is briefly explained below.

Suppose that a liquid crystal cell is prepared with a film exhibiting an absorption characteristic (normally, a vapor-deposited gold or a silver film 30 to 50 nm thick) as an electrode and a p-polarization light (having an electric field vector in the plane of incidence) is applied to this liquid crystal cell. The light is reflected substantially in its entirety by the metal film up to a predetermined angle of incidence. When the total reflection angle specified by the dielectric tensor is exceeded, however, a phenomenon is known to occur in which light energy is exchanged with the metal film, thereby exhibiting a unique reflection intensity profile determined by the metal film, the orientation film and the liquid crystal.

This reflection intensity profile is sensitive especially to the properties (the layer structures and the molecular arrangement of the liquid crystal) of the material directly under the metal film. The layer structures and the molecular arrangement of the liquid crystal can therefore be fully and specifically examined from the relation between the absolute value of reflection intensity and the angle of incidence associated with the particular intensity (hereinafter referred to as "the ATR curve").

Figure 8:
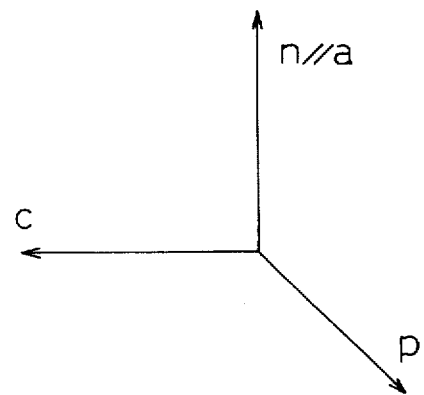
FIG. 8 is a diagram showing the relation between a polarization vector p and other vector parameters of a ferroelectric liquid crystal.

Now, a method of determining the layer structures and the molecular arrangement will be described. The c director and the a director are used for describing layer structures and a molecular arrangement. The free energy density F of a liquid crystal taking the elastic deformation of the c director and the a director into consideration is given by the following equation ("Liquid Crystals", by Nakagawa, 1990, Vol 8, No. 5, 651-675).

$$F = A/2*(\nabla \cdot a)^2 + \{(\nabla \cdot c)^2 + (\nabla \times c)^2\} - D*c \cdot \nabla \times c + D1*v \cdot \nabla \times c - C*(\nabla \cdot a)*(\nabla \cdot c) + L/2*(\kappa - \kappa 0)^2 \quad (1)$$

where capital letters A, C, D, D1 and L designate elastic constants representing the deformation of the layer and the molecular arrangement. Also, the relation described below holds between the parameters.

$$\kappa = a \cdot v - 1 \quad (2)$$

$$\kappa 0 = dA/dc^* \quad (3)$$

$$p = v \times c \quad (4)$$

$$a \parallel v \quad (5)$$

where dA is the layer thickness at smectic A phase, dc* the layer thickness at smectic C* phase, v the unit vector in the direction of the normal to the layer, and p the polarization vector having an orthogonal relation as shown in FIG. 8 with the a and c vectors.

An actual liquid crystal cell assumes layer structures and a molecular arrangement stable in terms of energy when the value of the energy density given by equation (1) above integrated over the entire bulk is in equilibrium with the surface anchoring energy Fs (Fs0 for the lower substrate, and Fsd for the upper substrate) indicating the restriction from the interface, as follows.

$$Fs0 = -g/2|\exp\{-\sigma*\sin((\Phi - \Phi 0)/2)\} + \exp\{-\sigma*\cos((\Phi + \Phi 0)/2)\}| \quad (6)$$

$$Fsd = -g/2|\exp\{-\sigma*\sin((\Phi - \Phi d)/2)\} + \exp\{-\sigma*\cos((\Phi + \Phi d)/2)\}| \quad (7)$$

where g and σ are coefficients, Φ0 is the c director pretilt 6 for the lower substrate side, and Φd is the c director pretilt 6 for the upper substrate side.

The elastic constant, the coefficients and the parameters are fitted in such a manner as to coincide with the ATR curve determined by numerical calculations based on equations (1), (6) and (7) and experimentally obtained for the particular layer structures and the molecular arrangement. In this way, layer structures and a molecular arrangement stable, in terms of energy, can be confirmed in the liquid crystal cell.

The energy level is determined by the calculations based on equations (1), (6) and (7) using the c director and the a director of the layer structures and the molecular arrangement obtained by the fitting of the ATR curve.

An example method of fabricating an actual liquid crystal cell will be explained as an embodiment of the invention.

FIRST EMBODIMENT

According to the first embodiment, an ITO electrode is formed on each of a pair of glass substrates with an orientation film coated on each of the electrodes. Different orientation film materials have different optimum values of thickness and other conditions for forming an orientation film. The first embodiment will be described with reference to the case in which Hoechst's Polix008 is used as an orientation film. Two types of chiral materials having different pitches are mixed at 0.5% each with Polix008, and a film is formed to the thickness of about 6 nm on the ITO electrode on the glass substrate. After that, the film is rubbed.

The rubbing process is performed in a direction substantially coincident with the z axis shown in FIGS. 1A, 1D, 1E and 1F. A pair of substrates are arranged with the orientation film surfaces thereof in opposed relation to each other, and baked under pressure with the peripheral portions thereof fixed by resin. The ferroelectric liquid crystal material Felix-T252 made by Hoechst is injected, the injection hole is sealed by resin, and the isotropic processing is performed, thus completing a liquid crystal cell. The phase series of Felix-T252 is shown below.

X→(−8)→SmC*→(54)→SmA→(76)→N*→(80)→I where X represents crystal, SmC* the smectic C* phase, SmA the smectic A phase, N* the cholesteric phase, and I the isotropic phase. The figures in the parentheses indicate the temperature (° C.) for transition to each phase.

The liquid crystal cell thus obtained is subjected to AC field processing by applying a rectangular wave of 30 volts, 30 Hz thereto for one minute. The measurement conducted on this liquid crystal cell by the ATR process confirmed the characteristic indicating the layer structures and the molecular arrangement as shown in FIGS. 3A to 3D and the characteristic indicating the layer structures and the molecular arrangement as shown in FIGS. 5A to 5D in the same pixel.

Explanation will be made about the liquid cell configuration obtained from the characteristics representing the layer structures and the molecular arrangement shown in FIGS. 3A to 3D and FIGS. 5A to 5D.

FIGS. 3A to 3D and FIGS. 5A to 5D show the distribution along the y axis of the y-axis component ay of the a director, and the x-axis component cx, the y-axis component cy and the z-axis component cz of the c director, with the distance between the substrates along the abscissa specified as unity.

The substrate interface layer tilt angle 5 is estimated from the values along the ordinate at 0.0 and 1.0 on the abscissa of the y-axis component ay of the a director (the value along the ordinate at 0.0 on the abscissa represents the value for the upper substrate, and the value along the ordinate at 1.0 on the abscissa gives the value for the lower substrate). Also, the geometry of the layer structures is estimated from the traces of the y-axis component ay of the a director. More specifically, the angle of the c director in the cell can be calculated anywhere from Tan⁻¹(ay).

Figure 3E:
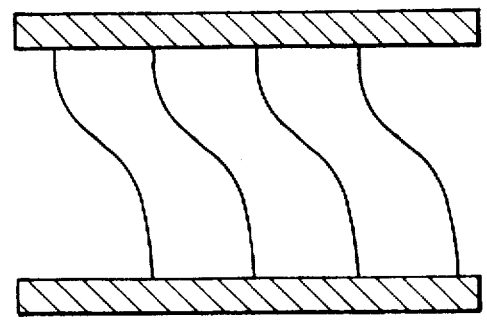
FIG. 3E is a sectional view of the layer structures of a liquid crystal device according to the invention as estimated from FIG. 3A.

The substrate interface layer tilt angle 5 of 4° was obtained from FIG. 3A. The layer structures with the substrate interface tilt angle 5 of 4° can be estimated as shown in FIG. 3E.

Also, the c director pretilt 6 at the substrate interface can be calculated from the values along the ordinate at 0.0 and 1.0 on the abscissa of the x-axis component of the c director shown in FIG. 3B. The director pretilt 6 of 1° could be obtained from FIG. 3B. The sign of the x-axis component cx of the c director is positive and constant in FIG. 3B. Even in the case where the x-axis component cx of the c director is negative and constant, however, the energy calculated from equation (1) was equivalent.

Figure 5E:
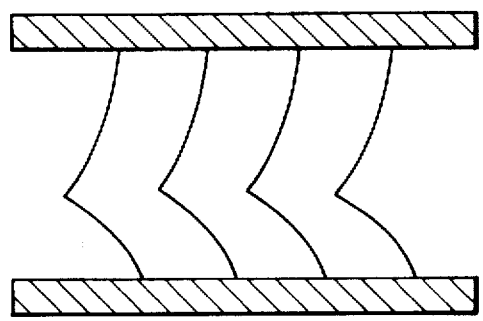
FIG. 5E is a sectional view of the layer structures of a liquid crystal device according to the invention as estimated from FIG. 5A.

In a similar fashion, the substrate interface tilt angle 5 obtained from FIG. 5B was 10°, and the c director pretilt 6 at the substrate interface was 10°. In this configuration, the y-axis component ay of the a director continuously changes while being asymmetrically distributed from 0.0 to 1.0 about a symmetry axis at equal distance from the substrate, i.e., at 0.5 on the abscissa. This indicates that the layer structures are asymmetric about a symmetry plane equidistant from the two substrates. The layer structures with the substrate interface layer tilt angle 5 of 10° is estimated as shown in FIG. 5E.

In FIG. 5B, the x-axis component cx of the c director is negative and constant. As in the case of FIG. 3B, a positive and constant x-axis component cx of the c director is equivalent in terms of energy.

Also, the characteristic exhibited by the layer structures and the molecular arrangement as shown in FIGS. 4A to 4D, the characteristic exhibited by the layer structures and the molecular arrangement as shown in FIGS. 6A to 6D and the state in which these layer structures and the molecular arrangements coexist in the same pixel could be confirmed by regulating the density, types, numbers, properties, etc. of the chiral material mixed with the orientation film of the liquid crystal cell prepared according to the first embodiment.

FIGS. 4A to 4D and FIGS. 6A to 6D, like FIGS. 3A to 3D and FIGS. 5A to 5D, represent an example of the characteristic exhibiting the configuration of the layer structures and the molecular arrangement. FIGS. 4A to 4D and FIGS. 6A to 6D show a distribution along the y axis of the y-axis component ay of the a director, and the x-axis component cx, the y-axis component cy and the z-axis component cz of the c director with the distance between the two substrates specified as unity.

Figure 4E:
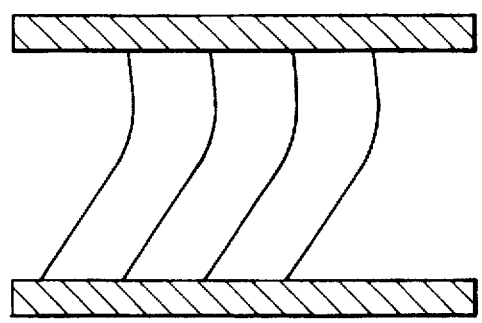
FIG. 4E is a sectional view of the layer structures of a liquid crystal device according to the invention as estimated from FIG. 4A.

From the characteristics of FIGS. 4A and 4B, the substrate interface layer tilt angle 5 can be calculated as 1°, and the c director pretilt 6 at the substrate interface as 3°. The layer structure with the substrate interface layer tilt angle 5 of 3° is estimated as shown in FIG. 4E. Also, the x-axis component cx of the c director in FIG. 4B is positive and constant. A negative x-axis component cx of the c director is also equivalent in terms of energy as in the case of FIG. 3B.

Figure 6E:
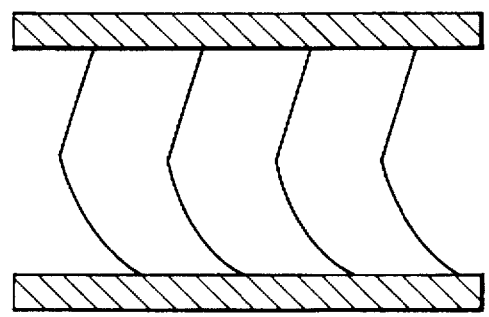
FIG. 6E is a sectional view of the layer structures of a liquid crystal device according to the invention as estimated from FIG. 6A.

From the characteristics of FIGS. 6A and 6B, the substrate interface layer tilt angle 5 can be calculated as 15°, and the angle of the c director pretilt 6 at the substrate interface can be calculated as 15° from the substrate plane. In the configuration of the liquid crystal cell obtained from these characteristics, though not so conspicuous as in the case of FIGS. 5A, 5B, the y-axis component ay of the a director continuously changes while being asymmetrically distributed from 0.1 to 1.0 on the abscissa assuming that a symmetry axis is taken at 0.5 on the abscissa between a pair of substrates. The layer structure having this substrate interface layer tilt angle 5 of 15° is estimated as shown in FIG. 6E. Also, the x-axis component cx of the c director is negative and constant. In this case, as in the case of FIGS. 3A and 3B, the x-axis component cx of the c director, if positive, is equivalent in terms of energy.

SECOND EMBODIMENT

A liquid crystal cell was prepared according to the second embodiment under the same conditions as in the first embodiment, except that Polix008 of Hoechst in the first embodiment was not mixed with the chiral material but used as an orientation film in the present case.

The liquid crystal cell obtained in this manner was impressed with a rectangular wave of 30 volts, 30 Hz for one minute and thus subjected to AC field processing. This liquid crystal cell was measured by the ATR method, with the result that the characteristics exhibiting the layer structures and the molecular arrangement could be confirmed as shown in FIGS. 3A to 3D.

From the value of the x-axis component cx of the c director along the ordinate at 0.0 on the abscissa shown in FIG. 3B, the c director pretilt 6 for one of the substrate interfaces can be calculated. Also, it is possible to calculate the c director pretilt 6 for the other substrate interface from the value of the x-axis component cx of the c director along the ordinate at 1.0 on the abscissa. In FIG. 3B, the values along the ordinate are equal at points 0.0 and 1.0 on the abscissa, and therefore the c director pretilts 6 at the two substrate interfaces could be calculated as 10°. Also, the x-axis component cx of the c director is positive and constant in FIG. 3B. The c director at the substrate interface, therefore, was found to be arranged in plane symmetry.

The first embodiment represents at least two types of layer structures. The second embodiment, on the other hand, is the one in which the c director is symmetric, and has a plurality of layers in the same pixel as described above. Consequently, it follows that the second embodiment has the same layer structures as the first embodiment, and the layer structures estimated from FIGS. 3A to 3D are as shown in FIG. 3E.

THIRD EMBODIMENT

Next, a liquid crystal cell was prepared according to the third embodiment by changing the material of the orientation film used for one of the substrates in the second embodiment while using the same material for the orientation film of the other substrate as in the first embodiment. The orientation films were prepared by forming Polix008 of Hoechst on the electrode of one of the substrates, and Polix004 of Hoechst on the electrode of the other substrate. The films thus formed were rubbed, assembled in the same procedure as in the second embodiment, and subjected to a similar test as in the second embodiment. As a result, the characteristics showing a configuration of the layer structures and the molecular arrangement as shown in FIGS. 4A to 4D could be confirmed from the ATR curve.

According to the characteristics shown in FIGS. 4A to 4D, the c director pretilts 6 at the two substrate interfaces were calculated as 3°, respectively. The x-axis component cx of the c director is positive and constant. Therefore, it was found that the c director at the substrate interface is arranged in plane symmetry. Layer structures as shown in FIG. 4E can be estimated from FIGS. 4A to 4D.

FOURTH EMBODIMENT

A liquid crystal cell according to the fourth embodiment was prepared by changing the orientation film used for one of the substrates in the second embodiment and using the same material as in the second and third embodiments for the other substrate. Polix008 of Hoechst was formed and rubbed on the electrode of one of the electrodes, and an LB film was formed and assembled in the same procedure as in the preceding cases on the electrode of the other substrate. Then, a similar experiment was conducted. From the ATR curve, a characteristic representing the configuration of the layer structures and the molecular arrangement as shown in FIGS. 5A to 5D could be confirmed.

In FIGS. 5A and 5B, the c director pretilt 6 at the two substrate interfaces was 10°. The x-axis component cx of the c director is negative and constant, and therefore the c director at the substrate interface was found to be arranged in plane symmetry. The layer structures as shown in FIG. 5E are estimated from FIGS. 5A to 5D.

REFERENCE

A liquid crystal cell was prepared in a manner similar to the first embodiment and subjected to AC field processing with a voltage value lower than in the first embodiment, thus preparing a reference. The liquid crystal cell according to this reference was measured by the ATR method. As a result, the characteristics representing all the layer structures and molecular arrangements in the same pixel were found as shown in FIGS. 7A to 7D.

Figure 7A:
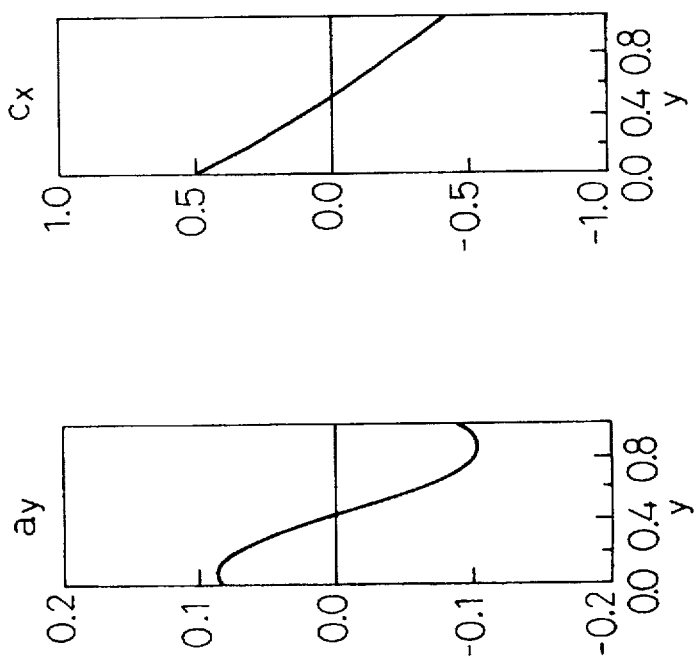
FIGS. 7A to 7D are diagrams showing a fourth example configuration of the layer structures and the molecular arrangement of a liquid crystal device not included in the invention, in which the distribution along y axis of the y-axis component of the a director and the x-axis, y-axis and z-axis components of the c director is shown along the abscissa with the distance between the substrates specified as unity.
Figure 7B:
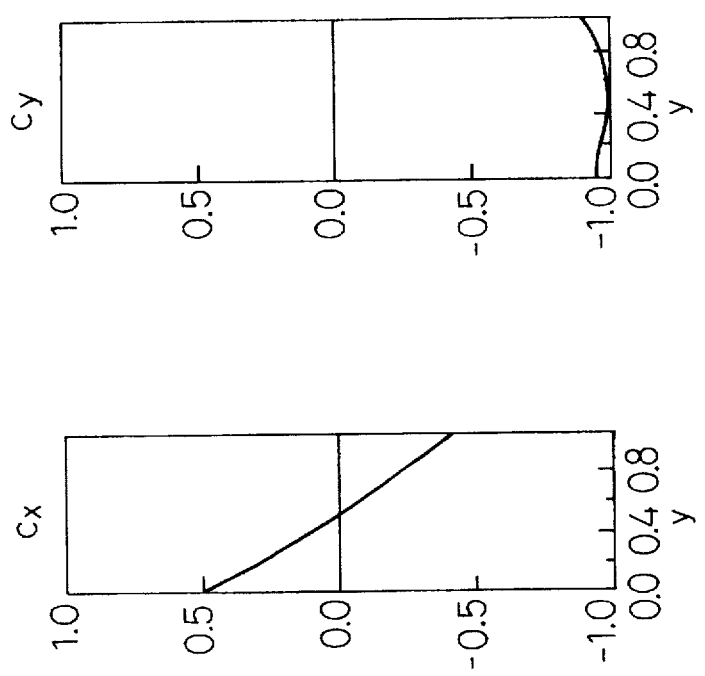
Figure 7C:
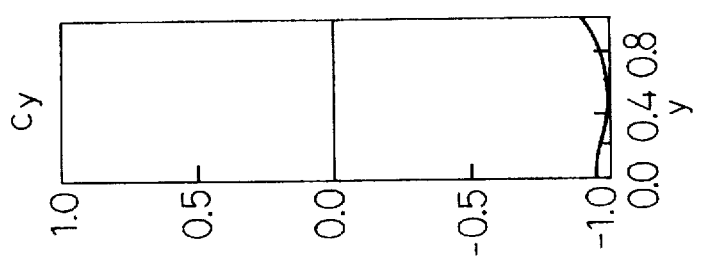
Figure 7D:
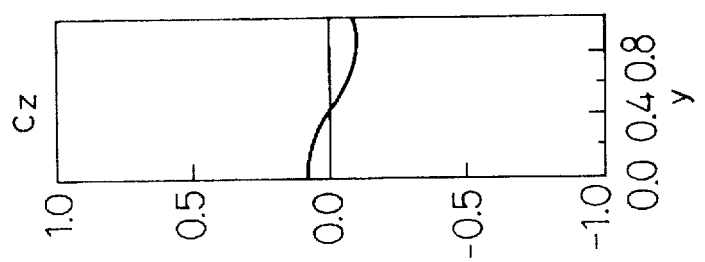
Figure 7E:
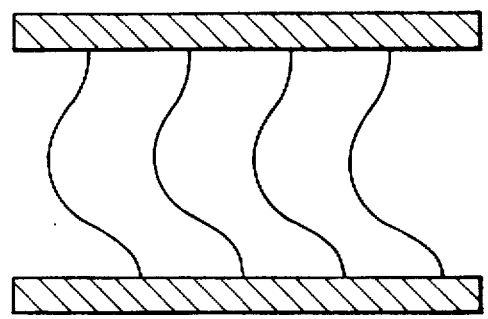
FIG. 7E is a sectional view of the layer structures of a liquid crystal device according to the invention as estimated from FIG. 7A.

FIGS. 7A to 7D show example characteristics of the configuration of the layer structures and the molecular arrangement not suitable for the present invention. FIGS. 7A, 7B were found to relate to the case in which the substrate interface layer tilt angle 5 is 4° and the c director pretilt at one of the substrate interfaces is 10°. The layer structures with the substrate interface layer tilt angle 5 of 4° is estimated as shown in FIG. 7E.

In this configuration, the x-axis component cx of the c director changes from positive to negative between a pair of substrates, in what is called the spray orientation. In this case, the value of the c director pretilt 6 is different between one substrate interface and the other substrate interface. These pretilts 6 lack plane symmetry. As described above, the spray orientation appears in other than the configuration shown in the invention, thereby making it impossible to secure a sufficient contrast.

For the layer structures not to be formed with the spray orientation as shown in FIGS. 7A to 7D, i.e., with both positive and negative x-axis components cx of the c director between a pair of substrates, the conditions as calculated below must be met. Specifically, equations (1), (6) and (7) indicate that the substrate interface layer tilt angle 5 is 0° to 3° (0° is associated with the presence of a layer plane perpendicular from the substrate), and the c director pretilt 6 that the c director 4 providing a vector of projection of the liquid crystal molecule on the layer plane forms with the component of the layer plane parallel with the substrate is 3° to 5°, or the substrate interface layer tilt angle 5 is 4° to 7° with the c director pretilt 6 of 0° (i.e., with the c director parallel with the substrate) to 3°, or the substrate interface layer tilt angle 5 is 8° to 20° with the c director pretilt 6 of 9° to 90°.

Of these layer structures, the layer structures and the molecular arrangement as shown in FIGS. 3A to 3D have a threshold voltage lower than the layer structures and the molecular arrangement shown in FIGS. 4A to 4D. Also, the layer structures and the molecular arrangement as shown in FIGS. 4A to 4D exhibit a threshold voltage lower than those shown in FIGS. 5A to 5D. Also, in view of the fact that each layer structure is stable in terms of energy and the liquid crystal cell prepared according to the first embodiment has a plurality of layer structures in one pixel, a liquid crystal device highly resistant to stress can be produced and selective partial drive is possible according to the difference of the threshold voltage, thus permitting gray scale display.

Further, in order to confirm the long-term stability of the liquid crystal cell prepared according to the second to fourth embodiments, the white write waveform and the transmitted light characteristics impressed were measured. The white write waveform and the transmitted light characteristics after voltage application are shown in FIGS. 9A and 9B, respectively, while the black write waveform and the transmitted light characteristic after voltage application are shown in FIGS. 10A and 10B, respectively.

Figure 9A:
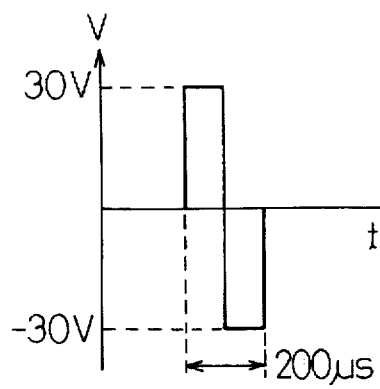
FIG. 9A is a diagram showing an evaluation test waveform (white write waveform) according to an embodiment of the invention.
Figure 9B:
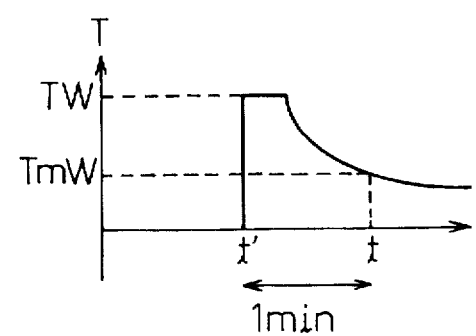
FIG. 9B is a diagram showing the transmittance after application of an evaluation test waveform (white write waveform) according to an embodiment of the invention.
Figure 10A:
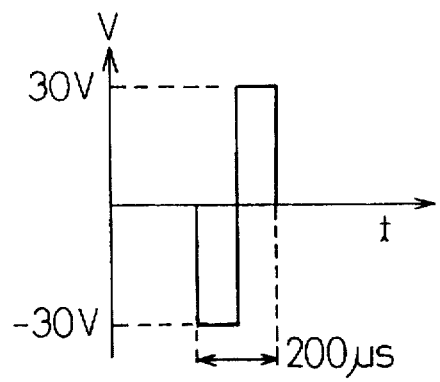
FIG. 10A is a diagram showing an evaluation test waveform (black write waveform) according to an embodiment of the invention.
Figure 10B:
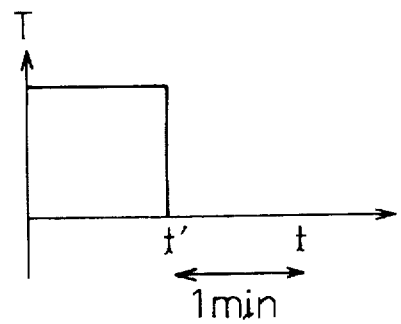
FIG. 10B is a diagram showing the transmittance after application of an evaluation test waveform (black write waveform) according to an embodiment of the invention.

In order to evaluate the unilateral stability, the amount of transmittance (TmW) one minute after the amount of transmittance (TW) immediately after application of the white write waveform shown in FIGS. 9A, 9B and the amount of transmittance (TmB) one minute after the time (TB) immediately following the application of the black write waveform shown in FIGS. 10A, 10B were measured for each embodiment and the reference. The result is shown in Table 1 below.

TABLE 1

|  | White (TmW/TW) | Black (TmB/TB) |
| --- | --- | --- |
| 2nd embodiment (FIGS. 3A to 3E) | 1.0 | 1.0 |
| 3rd embodiment (FIGS. 4A to 4E) | 1.0 | 1.0 |
| 4th embodiment (FIGS. 5A to 5E) | 1.0 | 1.0 |
| Reference (FIGS. 7A to 7E) | 0.6 | 1.0 |

Table 1 shows that the liquid crystal cell having the layer structures shown in FIGS. 7A to 7D of the reference has the amount of transmittance (TW) immediately after application of the white write waveform different from the amount of transmittance (TmW) one minute later. On the other hand, the liquid crystal cell having the layer structures shown in FIGS. 3A to 3D, 4A to 4D and 5A to 5D representing the second to fourth embodiments, respectively, were confirmed to have no difference in the transmittance amount. This indicates that there is no difference in contrast between the time of driving and the time of storage.

Figure 11:
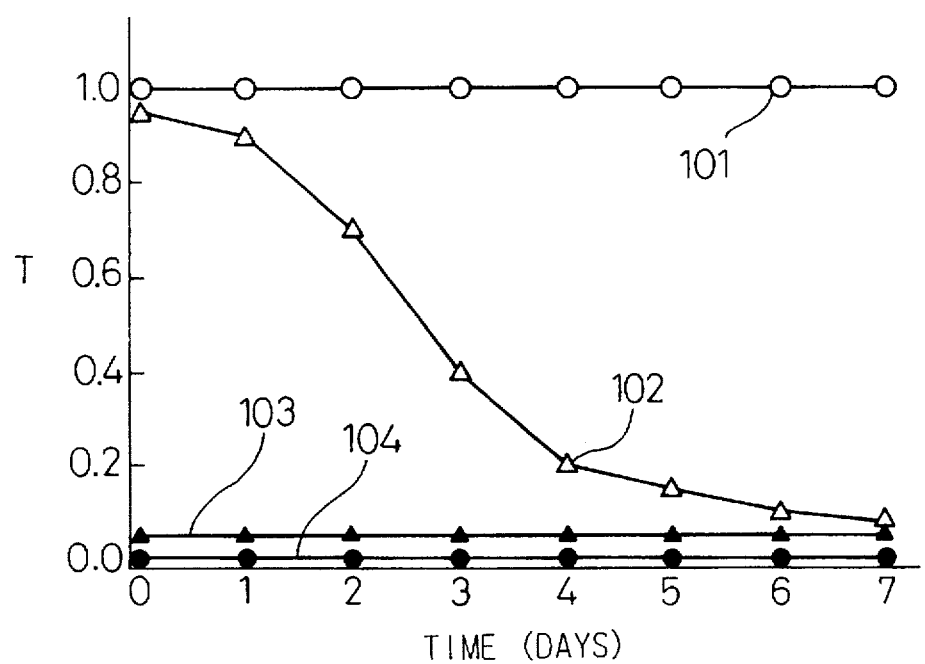
FIG. 11 is a graph showing the result of the unilaterally stable evaluation according to an embodiment of the invention.

Also, FIG. 11 shows the measurement of secular variations between the transmittance amount after application of the white write waveform and the transmittance amount after application of the black write waveform. The transmittance amount on the ordinate indicates an amount standardized using the transmittance amount (TW) immediately after application of the white write waveform and the transmittance amount (TB) immediately after application of the black write waveform. The abscissa represents the number of days that the display was allowed to stand. White circles (101) represent a change in transmittance amount at the time of application of the white write waveform for the liquid crystal cell according to the invention shown in FIGS. 3A to 3D. White triangles (102), on the other hand, represent a change in transmittance amount at the time of application of the white write waveform for the liquid crystal cell according to the reference shown in FIGS. 7A to 7D. Black circles (104) represent a change in transmittance amount at the time of application of the black write waveform for the liquid crystal cell according to the invention shown in FIGS. 3A to 3D. Black triangles (103) indicate a change in transmittance amount at the time of application of the black write waveform for the liquid crystal cell of the reference shown in FIGS. 7A to 7D. In the liquid crystal cell according to the invention shown in FIGS. 3A to 3D, the bistability was still exhibited 7 days after application (101) of the white write waveform. With the liquid crystal cell (102) according to the reference, by contrast, it was confirmed that the black side gradually changes to the unilaterally stable state higher in stability.

A unilateral stability evaluation test was similarly conducted on the liquid crystal cell having the configuration as shown in FIGS. 4A to 4D and FIGS. 5A to 5D. Consequently, it could be confirmed that a long-term bistability can be secured as compared with the liquid crystal cell of the reference as in the case of the liquid crystal cell shown in FIGS. 3A to 3D.

For the layer structures according to the invention to be formed, i.e., for the substrate interface layer tilt angle and the c director pretilt to be formed within the angular range of the invention, various methods are conceivable other than those of the embodiments of the invention described above. For example, a thin insulating film having coarse particles is formed by sputtering on an ITO electrode, and an orientation film not mixed with chiral material is coated and rubbed thereon. After that, a ferroelectric liquid crystal is injected into the liquid crystal cell, followed by application of an AC electric field. It was confirmed that the resulting distribution of the particles of the insulating film can form a plurality of layer structures including those shown above which are stable in terms of energy.

Further, the ferroelectric liquid crystal is injected into a liquid crystal cell which is formed by depositing a thin metal film about 10 nm thick on an ITO electrode, coating an orientation film thereon and further rubbing the assembly. Then, the AC field processing is performed thereby to form a plurality of layer structures including layer structures stable in terms of energy as described above. In the case where a plurality of layer structures are to be produced as described above by the above-mentioned AC field processing, the same effect can be achieved also by such means as making up structures with a distributed cell gap or producing a distribution of resistance value in the electrode film.

The layer structures can also be controlled by utilizing the chirality of the orientation film without the AC field processing. For example, the layer structures as described above can be produced by using a liquid crystal high polymer having a plurality of functional groups of ferroelectric liquid crystal in the side chain.

Substantially the same can be said of the antiferroelectric liquid crystal. In this case, however, it is easier and more positive to control the layer structures in the ferroelectric phase than to control the layer structures in antiferroelectric phase or ferrielectric phase. A more accurate control operation is possible by the intermediary of the ferroelectric phase in an electric field or a magnetic field at the time of cooling from isotropic to room temperature.

In the second to fourth embodiments described above, the liquid crystal cells having the configurations shown in FIGS. 3A to 3D and FIGS. 5A to 5D were prepared by changing the type of the orientation film material for one of the substrates. Even when the same orientation film material is used, however, it was confirmed that the liquid crystal cells having the configurations shown in FIGS. 3A to 3D, FIGS. 4A to 4D and FIGS. 5A to 5D can be obtained by changing the film-forming conditions. The inventors have also confirmed that the conditions exist that can produce a similar configuration with other combinations of the orientation film materials.

FIELD OF INDUSTRIAL UTILIZATION

The configuration of a liquid crystal device having layer structures and a molecular arrangement with at least two types of substrate interface layer tilt angles shown in the present invention is not only superior in rigidity but also exhibits a threshold value characteristic different due to the special layer structures. Since different behaviors are exhibited according to the voltage applied at the time of driving, the switching region in a pixel can be controlled for a ferroelectric liquid crystal electro-optical device. In an antiferroelectric electro-optical device, on the other hand, the region of field induced phase transition can be controlled. For this reason, an analog gray scale display having a threshold voltage high in stress resistance is made possible.

Also, in the configuration of a liquid crystal device having layer structures and a molecular arrangement with the c director pretilt arranged symmetrically on the two substrates according to the invention, the layer structures and the molecular arrangement at the time of white write and black write are equivalent in terms of energy. Further, the molecular arrangement is stable with a substantially equal amount of transmittance between the drive time and storage time. As a result, a long-term bistability is assured without any difference in contrast between storage time and drive time. Consequently, a superior liquid crystal electro-optical device can be very effectively obtained which is high in long-term reliability and free of flicker at the time of driving.

We claim:

1. A liquid crystal device with liquid crystal representing layer structures held between a pair of parallel substrates each having an electrode and a plurality of pixels formed between said electrodes, characterized in that said layer structures are arranged in such a manner that there are at least two substrate interface layer tilt angles that the normal to a selected one of the substrates forms with the layer plane of said layer structures within the same pixel, and at least one of said layer structures in said same pixel has said substrate interface layer tilt angles of 0° to 3°, and the c director pretilt that the c director providing a unit vector of projection of said liquid crystal molecule on said layer plane at said substrate interface forms with the component of said layer plane parallel with said substrate is 3° to 5°.

2. A liquid crystal device with liquid crystal representing layer structures held between a pair of parallel substrates each having an electrode and a plurality of pixels between said electrodes, characterized in that said layer structures are arranged in such a manner that there are at least two substrate interface layer tilt angles that the normal to a selected one of the substrates forms with the layer plane of said layer structures within the same pixel, and at least one of said layer structures in said same pixel has said substrate interface layer tilt angles of 4° to 7°, and the c director pretilt that the c director providing a unit vector of projection of said liquid crystal molecule on said layer plane at said substrate interface forms with the component of said layer plane parallel with said substrate is 0° to 3°.

3. A liquid crystal device with liquid crystal representing layer structures held between a pair of parallel substrates each having an electrode and a plurality of pixels between said electrodes, characterized in that said layer structures are arranged in such a manner that there are at least two substrate interface layer tilt angles that the normal to a selected one of the substrates forms with the layer plane of said layer structures within the same pixel, said substrate interface layer tilt angles of said layer structures being variable between said electrodes, and at least one of said layer structures in said same pixel has said substrate interface layer tilt angles of 8° to 20°, and the c director pretilt that the c director providing a unit vector of projection of said liquid crystal molecule on said layer plane at said substrate interface forms with the component of said layer plane parallel with said substrate is 9° to 90°.

4. A liquid crystal device according to any one of claims 1 to 3, wherein said layer structures within said one pixel are partly or wholly formed asymmetric about a symmetry plane equidistant from said two substrates.

5. A liquid crystal device according to claim 4, wherein said liquid crystal is ferroelectric.

6. A liquid crystal device according to claim 4, wherein said liquid crystal is antiferroelectric.

7. A liquid crystal device according to any one of claims 1 to 3, wherein said layer structures within said one pixel are partly or wholly formed symmetric about a symmetry plane equidistant from said two substrates.

8. A liquid crystal device according to claim 7, wherein said liquid crystal is ferroelectric.

9. A liquid crystal device according to claim 7, wherein said liquid crystal is antiferroelectric.

10. A liquid crystal device with liquid crystal representing layer structures held between a pair of parallel substrates each having an electrode and a plurality of pixels formed between said electrodes, characterized in that the c director providing a unit vector of projection of the liquid crystal molecule on the layer plane of said layer structures is arranged symmetrically about a symmetry plane equidistant from said substrates at the substrate interface in the same pixel, and the substrate interface layer tilt angle providing an angle that the normal to selected one of the substrates forms with the layer plane is 0° to 3°, and that the c director pretilt providing an angle that said c director forms with the component of said layer plane parallel with said substrate is 3° to 5°.

11. A liquid crystal device with liquid crystal representing layer structures held between a pair of parallel substrates each having an electrode and a plurality of pixels formed between said electrodes, characterized in that the c director providing a unit vector of projection of the liquid crystal molecule on the layer plane of said layer structures is arranged symmetrically about a symmetry plane equidistant from said substrates at the substrate interface in the same pixel, and the substrate interface layer tilt angle providing an angle that the normal to selected one of the substrates forms with the layer plane is 4° to 7°, and the c director pretilt providing an angle that said c director forms with the component of said layer plane parallel with said substrate is 0° to 3°.

12. A liquid crystal device with liquid crystal representing layer structures held between a pair of parallel substrates each having an electrode and a plurality of pixels formed between said electrodes, characterized in that substrate interface layer tilt angles of said layer structures are variable between said electrodes, the c director providing a unit vector of projection of the liquid crystal molecule on the layer plane of said layer structures is arranged symmetrically about a symmetry plane equidistant from said substrates at the substrate interface in the same pixel, and the substrate interface layer tilt angle providing an angle that the normal to selected one of the substrates forms with the layer plane is 8° to 20°, and the c director pretilt providing an angle that said c director forms with the component of said layer plane parallel with said substrate is 9° to 90°.

13. A lipped crystal device according to any one of claims 1 to 3 or 10 to 12, wherein said liquid crystal is ferroelectric.

14. A liquid crystal device according to any one of claims 1 to 3 or 10 to 12, wherein said liquid crystal is antiferroelectric.

* * * * *